United States Patent
Fang et al.

(10) Patent No.: US 6,332,176 B1
(45) Date of Patent: Dec. 18, 2001

(54) AUTOHOST CONTROLLER

(75) Inventors: Cheng-Chi Fang, Union City; Chao-I Chang, San Jose, both of CA (US); Ka Kit Ling, 1294 Hazlett Way, San Jose, CA (US) 95131

(73) Assignees: Integrated Memory Logic, Inc., Campbell; Ka Kit Ling, San Jose, both of CA (US)

( * ) Notice: Subject to any disclaimer, the term of this patent is extended or adjusted under 35 U.S.C. 154(b) by 0 days.

(21) Appl. No.: 09/130,999

(22) Filed: Aug. 7, 1998

(51) Int. Cl.[7] .................. G06F 13/00; G06F 12/06; G06F 13/28; G06F 3/00
(52) U.S. Cl. .................. 711/113; 711/118; 711/133; 711/154; 710/22; 710/52
(58) Field of Search .................. 711/141, 133, 711/103, 113, 4, 118; 710/52, 54, 57, 22, 244, 33; 395/840

(56) References Cited

U.S. PATENT DOCUMENTS

| | | | |
|---|---|---|---|
| 4,371,927 | * 2/1983 | Wilhite et al. | 364/200 |
| 4,723,223 | 2/1988 | Hanada | 710/26 |
| 5,333,290 | 7/1994 | Kato | 710/26 |
| 5,522,055 | * 5/1996 | Kamanaka et al. | 711/113 |
| 5,555,380 | * 9/1996 | Suzuki | 710/33 |
| 5,577,224 | * 11/1996 | DeWitt et al. | 711/118 |
| 5,581,715 | 12/1996 | Verinsky | 710/2 |
| 5,623,700 | 4/1997 | Parks | 710/53 |
| 5,742,831 | * 4/1998 | Creta | 710/244 |
| 5,790,828 | * 8/1998 | Jost | 711/4 |
| 5,864,712 | * 1/1999 | Carmichael et al. | 395/840 |
| 5,893,920 | * 4/1999 | Shaheen et al. | 711/133 |
| 5,903,911 | * 5/1999 | Gaskins | 711/141 |
| 5,944,802 | * 8/1999 | Bello et al. | 710/52 |
| 6,012,106 | * 1/2000 | Schumann et al. | 710/22 |
| 6,038,636 | * 3/2000 | Brown, III et al. | 711/103 |
| 6,085,287 | * 7/2000 | O'Neil et al. | 711/113 |

* cited by examiner

Primary Examiner—Kevin L. Ellis
Assistant Examiner—B. R. Peugh
(74) Attorney, Agent, or Firm—Skjerven Morrill MacPherson LLP; Allen H. MacPherson; Gary J. Edwards

(57) ABSTRACT

A device controller for interfacing a host computer with an external storage device has an autohost controller. The device controller, at the end of a read operation, fills a memory buffer with data blocks contiguous with the read operation. On a subsequent read operation, the autohost controller checks the subsequent read operation and, if the requested data is within the memory buffer, directs the device controller to transfer the data from the memory buffer without intervention from an external microprocessor. If the autohost controller does not intervene, the device controller operates under the control of the microprocessor, as normal.

10 Claims, 12 Drawing Sheets

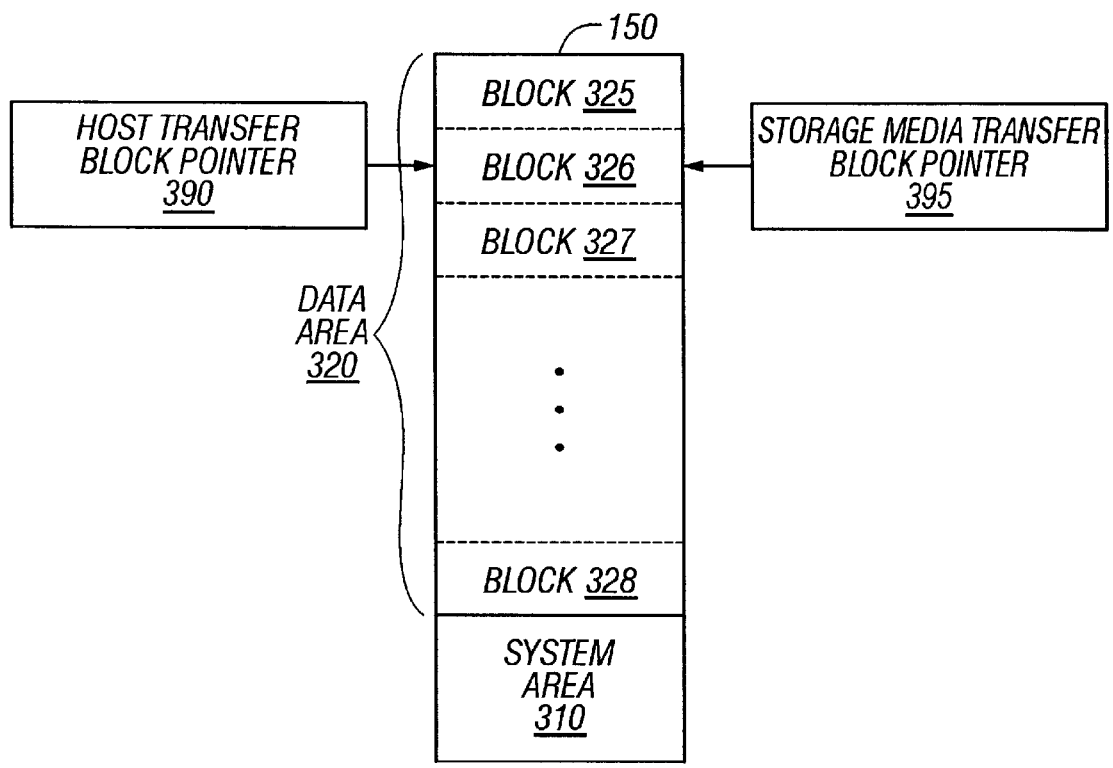
FIG. 3(a)
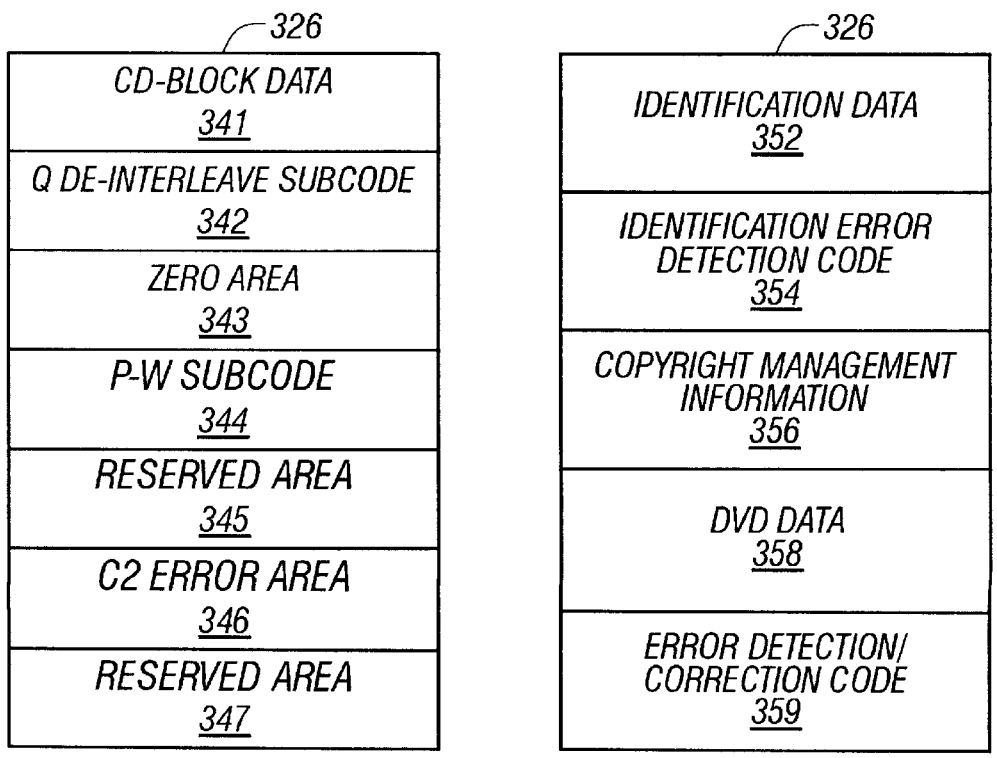
FIG. 3(b)  FIG. 3(c)

```
module autohost (dmbc, ahoste, next_lbah, next-lbam, vcbcl, pclk,
reqrst, ide_wr,
                packet_done, pdin, packetf_en, packet_cnt, a28e, aa8e,
                autohost_en, tran_length, command_in_busy, afeat_0, t_done );

input    pclk;
input    ide_wr;
input    [15:0]    pdin;
input    packetf_en;
input    [2:0]    packet_cnt;
input    reqrst;
input    [8:0]    vcbcl;
input    [7:0]    next_lbah;
input    [7:0]    next_lbam;
input    [7:0]    next_lbal;
input    [15:0]    dmbc;
input    packet_done;
input    a28e;
input    aa8e;
input    ahoste;
input    command_in_busy;
input    afeat_0;
input    t_done;

output    autohost_en;
output    [7:0]    tran_length;

reg    byte1;
reg    byte0;
reg    byte3;
reg    byte2;
reg    byte45;
reg    byte67;
reg    [7:0]    byte8;
reg    [7:0]    byte9;
reg    byte1011;
reg    autohost_en;
reg    auto_a8en;
//reg    auto_28en;
```

FIG. 7(a-1)

```
wire    [9:0]   comp_vcbcl_reqlength;
wire    vcbcl_larger;
wire    byte9_eq_0;
wire    autohost_en_p;
wire    next_lbah_eq_host_lbah;
wire    next_lbam_eq_host_lbaml;
//wire  autohost_int;
wire    autohost_en_1;
wire    autohost_en_2;
wire    autohost_en_3;
wire    [7:0]   tran_length;
wire    non_tran_length;
wire    more_than_1word;
wire    more_than_1word_h;
wire    more_than_1word_l;

assign tran_length = auto_a8en? byte9 : byte8;
assign non_tran_length = auto_a8en? byte8[0] : byte9[0];

assign more_than_1word_h = (dmbc[15:8] == 8'h00);
assign more_than_1word_l = (dmbc[7:1] == 7'h00);

assign more_than_1word =  ~afeat_0 & more_than_1word_h & more_than_1word_l;

assign comp_vcbcl_reqlength = {1'b1,vcbcl} - {2'b00,tran_length};
assign vcbcl_larger = comp_vcbcl_reqlength[9];
assign byte9_eq_0 = (tran_length == 8'h00);
assign next_lbah_eq_host_lbah = byte3;
assign next_lbam_eq_host_lbaml = byte45;
```

*FIG. 7(a-2)*

```
assign autohost_en_1 = byte2 & ~command_in_busy & byte0 & byte1 & byte67 &
non_tran_length;

assign autohost_en_2 = ahoste & vcbcl_larger & ~byte9_eq_0;
assign autohost_en_3 = next_lbah_eq_host_lbah &
                       next_lbam_eq_host_lbaml & ~more_than_1word;

assign autohost_en_p = autohost_en_1 & autohost_en_2 & autohost_en_3 & byte1011;

wire autohost_en_off = reqrst | t_done;

always @ (posedge pclk or posedge autohost_en_off)

if (autohost_en_off)

autohost_en <= 0;

else if (packet_done)

autohost_en <= autohost_en_p;

always @ (posedge pclk or posedge reqrst)

if (reqrst)

begin
byte0 <= 0;
auto_a8en <= 0;
//auto_28en <=0;
end else if (packetf_en & (packet_cnt == 3'b000) & ide_wr &
        ((pdin[7:0] == 8'ha8) & aa8e))

begin
byte0 <= 1;
auto_a8en <=1;
end else if (packetf_en & (packet_cnt == 3'b000) & ide_wr &
        ((pdin[7:0] == 8'h28) & a28e))
```

FIG. 7(b-1)

```
begin
byte0 <= 1;
//auto_28en <=1;
end
``` always @ (posedge pclk or posedge reqrst)

if (reqrst)

byte1 <= 0;

else if (packetf_en & (packet_cnt == 3´b000) & ide_wr & (pdin[15:8] == 8´h00))

byte1 <= 1;

always @ (posedge pclk or posedge reqrst)

if (reqrst)

byte3 <= 0;

else if (packetf_en & (packet_cnt == 3´b001) & ide_wr & (pdin[15:8] == next_lbah))

byte3 <= 1;

*FIG. 7(b-2)* always @ (posedge pclk or posedge reqrst)

if (reqrst)

byte2 <= 0;

else if (packetf_en & (packet_cnt == 3´b001) & ide_wr & (pdin[7:0] == 8´h00))

byte2 <= 1;

always @ (posedge pclk or posedge reqrst)

if (reqrst)

byte45 <= 0;

else if (packetf_en & (packet_cnt == 3´b010) & ide_wr & (pdin == ext_lbal, next_lbam}))

byte45 <= 1;

always @ (posedge pclk or posedge reqrst)

if (reqrst)

byte67 <= 0;

else if (packetf_en & (packet_cnt == 3´b011) & ide_wr & (pdin[15:0] == 8´h00))

byte67 <= 1;

always @ (posedge pclk or posedge reqrst)

if (reqrst)

byte8 <= 0;

else if (auto_a8en & packetf_en & (packet_cnt == 3´b100) & ide_wr & (pdin[7:0] == 8´h00))

*FIG. 7(c-1)*

*byte8 <= 8´h01;*

*else if (~(auto_a8en) & packetf_en & (packet_cnt == 3´b100) & ide_wr )*

*byte8 <= pdin[7:0];*

*always @ (posedge pclk or posedge reqrst)*

*if (reqrst)*

*byte9 <= 0;*

*else if (auto_a8en & packetf_en & (packet_cnt == 3´b100) & ide_wr)*

*byte9 <= pdin[15:8];*

*else if (~(auto_a8en) & packetf_en & (packet_cnt == 3´b100) & ide_wr & (pdin[15:8] == 8´h00))*

*byte9 <= 8´h01;*

*always @ (posedge pclk or posedge reqrst)*

FIG. 7(c-2)

*if (reqrst)*

*byte1011 <= 0;*

*else if (packetf_en & (packet_cnt == 3´b101) & ide_wr & (pdin[15:0] == 8´h00))*

*byte1011 <= 1;*

*endmodule*

FIG. 7(d)

AUTOHOST CONTROLLER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

This invention relates generally to cache managers and in particular to a cache manager for storage devices such as CD-ROM drives, DVD-ROM/RAM/R, and hard drives.

2. Background

Advances in semiconductor manufacturing and microprocessor design have combined to create microprocessors with enormous processing power running at very high frequencies. However, the benefits of fast microprocessors are lost in a computer system that is also unable to retrieve data at a very high rate. Many techniques to improve the rate of data transfer between the microprocessor and main memory have been developed. However, the data transfer rate from storage devices—such as CD-ROM drives, DVD ROM/RAM/R, hard drives, and tape drives—to main memory or directly to the microprocessor still presents a bottleneck to the overall performance of the computer system.

Many computer applications process large quantities of data. For example, a multimedia application may process both video and audio data. High resolution graphics and high quality sound require a vast amount of audio and video data that must be transferred between the physical storage device and the multimedia system. CD-ROM disks are inexpensive to manufacture and hold a large quantity of data and therefore are the preferred medium for storing data. Another popular medium for multimedia data storage is digital video disk (DVD). However, other storage devices such as magnetic fixed disks and magneto-optical disks are also used. The data transfer rate between the storage device and the processor may dictate the speed of the entire computer system because data must be retrieved from the Storage device for the application program. An increase in the data transfer rate between the storage device and the host system, therefore, increases the speed of the entire computer system.

FIG. 1 shows a block diagram of a typical storage device 100 coupled to a host computer system 190 through a peripheral bus 160. A storage media 110, for example a CD-ROM, a DVD, a magnetic disk, or a magnetic tape, is driven by a motor 114 under the control of a motor/servo controller 118. Data on storage media 110 are stored in storage media data blocks. The specific format of a storage media data block is standardized but is different for each media. FIG. 3(*b*) illustrates a storage media block of a CD-ROM disk and FIG. 3(*c*) illustrates a storage media block for a DVD after the data is retrieved and processed by a typical CD-ROM/DVD controller. A signal detector/writer 122 (see FIG. 1), i.e., an optical head or a magnetic head, reads and writes data into storage media 110. Signal detector/writer 122 may read or generate feedback signals that are sent to motor/servo controller 118 for synchronization and tracking purposes.

On read transfers, the signal read by signal detector/writer 122 is amplified by an amplifier 126. In storage devices, synchronization data are also amplified before being sent to motor/servo controller 118. The amplified data signal is then sent to a digital signal processor (DSP) 130, which may also provide control signals to motor/servo controller 118, after converting the analog data signal to a digital signal in analog to digital converter 135. DSP 130 processes the digitized data in preparation for use by host computer system 190.

For example, a CD-ROM drive typically provides audio data recorded in digital form to an external amplifier in analog form. The processed digital data is sent to a device controller 140. In some storage devices, a secondary data channel may also be stored on storage media 110. For example, a CD-ROM disk contains a secondary data channel called the subcode data channel. On write transfers, DSP 130 generates a data signal for signal detector/writer 122 in response to data received from host computer system 190.

Device controller 140 typically uses a memory buffer 150 as a cache or buffer memory for the processed data from storage media 110 or the incoming data from host computer system 190. Device controller 140 also provides an interface between storage device 100 and peripheral bus 160.

Peripheral bus 160 could be, for example, an IDE bus using ATAPI protocols, a SCSI bus or an IEEE 1394-1995 bus. Because peripheral bus 160 communicates with many different types of storage devices, transfers on peripheral bus 160 are typically based on the number of data words to transfer rather than the number of storage media blocks. Peripheral bus 160 couples storage device 100 to host computer system 190.

Storage device 100 also contains a microcontroller 170, which could be a microprocessor, to control the components of storage device 100. Microcontroller 170 may use a portion of memory buffer 150 for system information. Microcontroller 170 executes firmware instructions, i.e. computer code stored in microcontroller 170, a ROM (not shown) or a flash memory device (not shown), to interface with host computer system 190 in conjunction with device controller 140 through peripheral bus 160. To reduce the cost of storage device 100, microcontroller 170 is typically a less powerful device than the microprocessor of host computer system 190. Therefore, microcontroller 170 executes instructions at a slower rate than the microprocessor of host computer system 190, further decreasing the data transfer rate between storage device 100 and host computer system 190.

In a typical read transaction, host computer system 190 sends a request for data through peripheral bus 160 to microcontroller 170 and device controller 140. Microcontroller 170 along with device controller 140 interprets the request and retrieves the requested data from storage media 110 into memory buffer 150. When memory buffer 150 contains a sufficient amount of data, device controller 140 and microcontroller 170 sends the stored data from memory buffer 150 to host computer system 190 through peripheral bus 160. The specific amount of data stored in memory buffer 1S0 before transfer to host computer system 190 depends on the specific request made by host computer system 190.

In a typical write transaction, host computer system 190 sends a write request to peripheral bus 160. Microcontroller 170 along with device controller 140 interprets the request and receives the incoming data from host computer system 190 into memory buffer 150. When memory buffer 150 contains a sufficient amount of data, device controller 140 and microcontroller 170 send the stored data from memory buffer 150 to storage media 110.

Interfacing with peripheral bus 160 is typically very complex. Therefore, the task of interfacing with peripheral bus 160 is divided between microcontroller 170 and device controller 140. In conventional storage devices, microcontroller 170 handles the bulk of the control portion of the interface and device controller 140 primarily handles the data transfer. However, since microcontroller 170 is a slow device, substantial delays are introduced by over-reliance on microcontroller 170. Therefore, there is a need for a method or apparatus to interface efficiently with peripheral bus 160 without the need for excessive assistance from microcontroller 170.

SUMMARY

According to the present invention, a read transaction is intercepted by a device controller if the data is already present in a memory buffer and the device controller fills the request without assistance from the microcontroller. On a read from a physical storage device data continues to be buffered into buffer memory until the buffer memory is filled. On a subsequent read, the device controller checks whether or not the data requested in the read is already contained in the buffer memory. If the data is not completely present, the microprocessor is alerted and the device controller reads the data from the physical storage device. If the data is present, the device controller intervenes and transfers the requested data from the memory buffer to the host computer. The microprocessor is then alerted and the memory buffer is refilled with data contiguous from the last read data.

Rate of access to the physical storage device is increased because, statistically, subsequent reads to the physical storage device are to contiguous sections of the physical storage device. Holding the next several contiguous blocks from the physical storage device saves the time of physically starting the physical storage device and reading the data from the physical storage device, an access time which is long compared to the access time of the buffer memory in the device controller.

In another embodiment of the invention, the device controller detects when a portion of the data is present in the memory buffer and starts the transfer of the present portion while alerting the microprocessor and the physical storage device to start reading the remainder.

In one embodiment, the conditions that trigger the device controller to take control include the condition that the requested logical block address of the first data block correspond to the logical block address of a starting block section of the memory buffer.

Embodiments of this invention are further explained below with the figures and the accompanying text. Embodiments of this invention include methods of transferring data as well as individual device controllers.

DESCRIPTION OF THE FIGURES

FIG. 3(*a*) shows a memory buffer used with the device controller.

FIG. 3(*b*) shows a data block that is typical for CD-ROM disks.

FIG. 3(*c*) shows a data block that is typical for DVDs.

FIGS. 7(*a*-1), 7(*a*-2), 7(*b*-2), 7(*b*-2), 7(*c*-1), 7(*c*-2), and 7(*d*) show Verilog code for an implementation of the auto-host according to the present invention.

DETAILED DESCRIPTION

Figure 1:
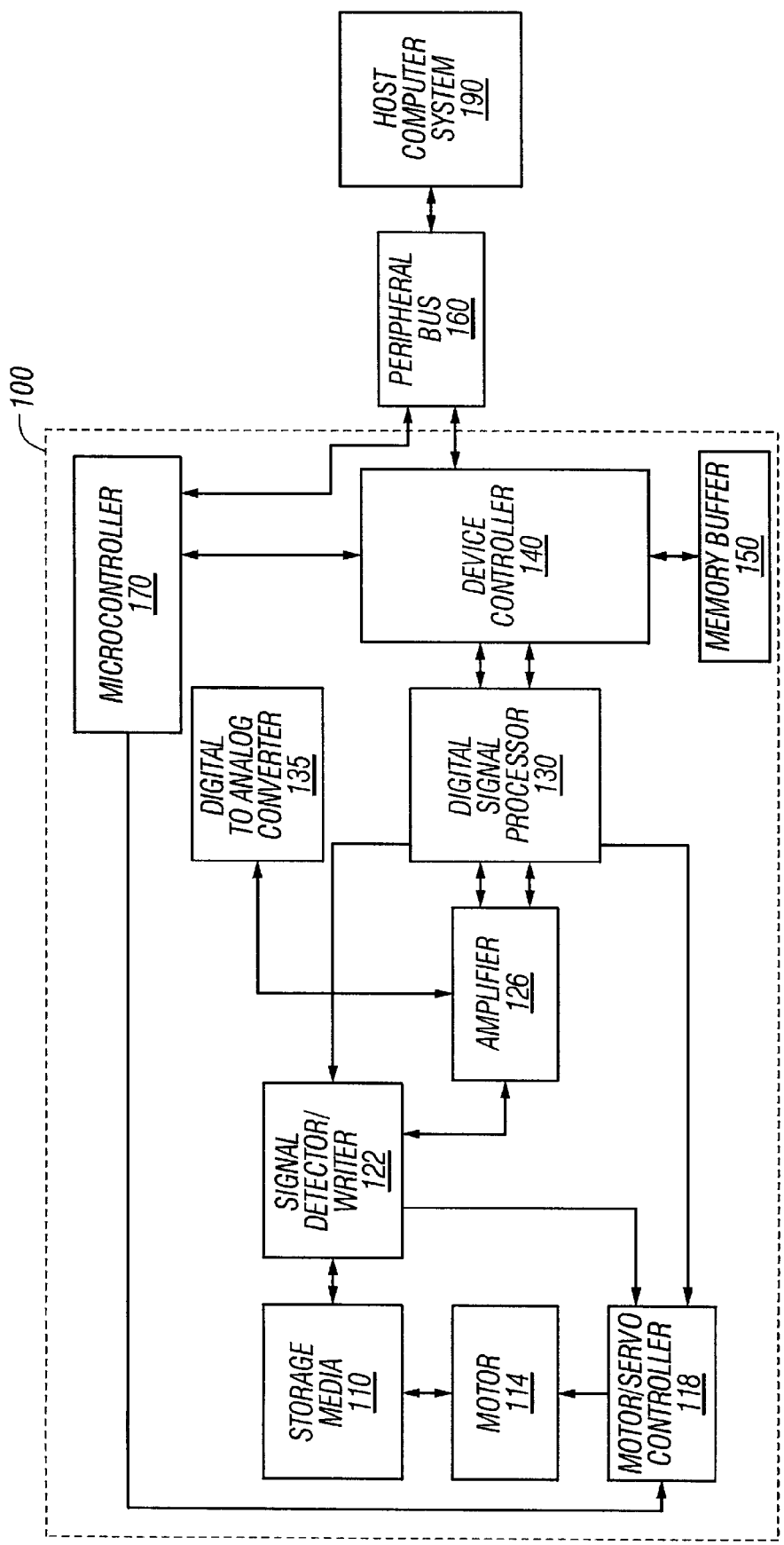
FIG. 1 shows a block diagram of a typical physical storage device.
Figure 2:
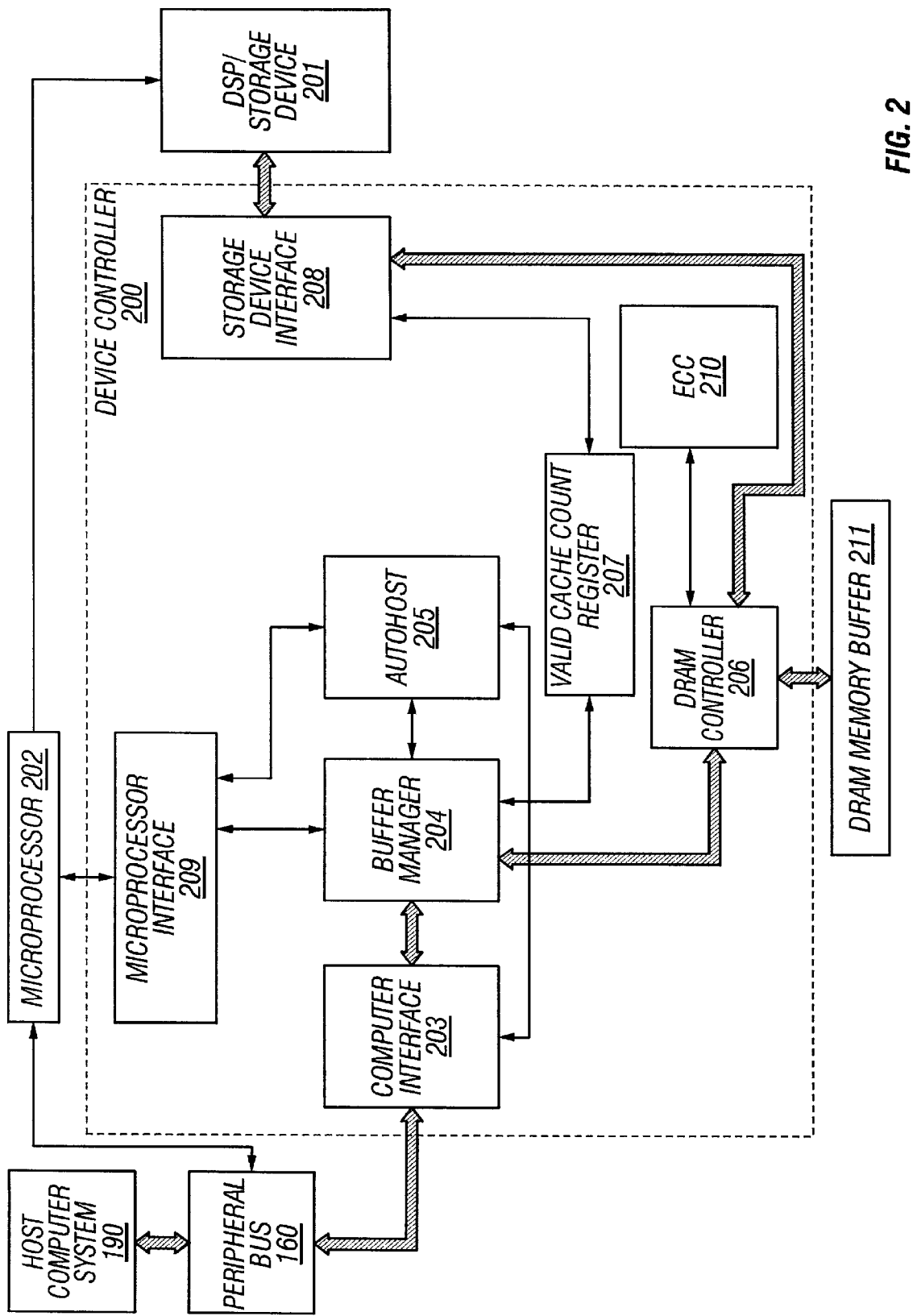
FIG. 2 shows a block diagram of a physical storage device controller according to an embodiment of the present invention.

FIG. 2 shows a functional block diagram of a device controller 200 according to the present invention. Host computer system 190 communicates with a device controller 200 through peripheral bus 160 as in FIG. 1. Information passing between the host computer 190 and device controller 200 are received into and out of buffer manager 204 through interface 203. Interface 203 interfaces device controller 200 to peripheral bus 160, which, for example, could be an IDE bus using ATA or ATAPI protocols, an SCSI bus, or an IEEE 1894-1995 bus. ATAPI protocols for CD-ROM devices are given in SMALL FORM FACTOR COMMITTEE, "Specification of ATA Packet Interface for CD-ROMs, SFF-8020i," Revision 2.5, Jul. 21, 1995 thereinafter "ATAPT specification"), herein incorporated by reference in its entirety.

A microprocessor 202, which may be the same as that of physical device 100, has firmware tailored to operate with device controller 200. Microprocessor 202 communicates with device controller 200 through a microprocessor interface 209.

The remainder of a physical storage device is represented by storage device 201. Storage device 201 includes digital signal processor 130, amplifier 126, signal detector/writer 122, storage media 110, motor 114, motor/servo controller 118, and possibly digital/analog converter 135. Device controller 200 communicates with storage device 201 through storage device interface 208. Finally, a DRAM memory buffer 211 communicates with device controller 200 through DRAM controller 206. Typically, various types of DRAM are used for memory buffer 211. These types of DRAM include fast page mode, EDO, synchronous, or RAMBUS. To maximize transfer speed, memory buffer 211 can be a dedicated SRAM cache. However, to save costs memory buffer 211 is often used for multiple purposes and implemented by a DRAM. Also, the DRAM could be embedded within device controller 200. A memory arbitration scheme is necessary for when DRAM memory buffer 211 is shared.

In the preferred embodiment of the invention, storage device 201 is a CD-ROM drive such as is available from Phillips Electronics Corp. However, other CD-ROM controllers from other manufacturers (Sony, Hitachi, etc.), DVD devices, magnetic storage devices, or other devices capable of physically storing and reading out data. In addition, some embodiments of the invention are capable of interaction with one of numerous storage devices, each of which have a unique interface protocol. Protocols for controlling each of the physical storage devices and for interfacing with each of the possible microprocessors are stored so that the resulting integrated circuit is more universally applicable. Similarly, embodiments of the invention are usable with any microprocessor such as, for example, the INTEL 8032 microprocessor.

In a read operation, storage device interface 208 receives data from storage device 201 and transfers that data to DRAM controller 206 for storage in DRAM memory buffer 211. The data is read from DRAM controller 206 into buffer manager 204 and transmitted to host computer 190 in response to buffer manager 204 control signals. In some embodiments, error correction of data read from storage device 201 and stored in DRAM memory buffer 211 is accomplished by an error correction circuit (ECC) 210. ECC performs statistical correction, i.e., a Reed-Solomon or Viterbi corrections, on data stored in DRAM memory buffer 211. This form of error correction, i.e. independently performing the error correction directly on DRAM memory buffer 211, is more often implemented when storage device 201 is CD-ROM. If the storage device 201 is DVD, however, the error correction must be done before the data is written into DRAM memory buffer 211 because of the greater speed of DVD devices compared to CD-ROM devices.

Each time a block of data is written into DRAM memory buffer 211, a valid cache count register 207 is incremented and whenever data is read from DRAM memory buffer 211 valid cache count register 207 is decremented. The above described data flow is reversed in a write operation.

FIG. 3(*a*) shows the contents of the DRAM buffer according to one implementation of device controller 200. DRAM memory buffer 211 is partitioned into a system area 310 and a data area 320. Data from storage media 110 are stored in data area 320. Most implementations of device controller 200 store entire logical blocks of data 325–328 from storage media 110 (storage media blocks) sequentially in data area 320. Furthermore, some implementations also store error detection information such as a checksum with each storage media block.

FIG. 3(*b*) shows the details of data block 326 if storage device 201 is a CD-ROM drive. For a CD-ROM, data block 326 includes CD block data 341 (typically 2,352 bytes), Q de-interleave subcode 342 (12 bytes), zero area 343 (4 bytes), P-W subcode 344 (96 bytes), optional reserved area 345 (96 bytes), optional C2 error area 346 (296 bytes), and optional reserved area 347 (216 bytes). Therefore, if storage device is a CD-ROM drive as described above, each data block 325–327 in data area 320 is either 2.5 kilobytes or 3.0 kilobytes in length. Other combinations of header, data areas, and error combinations yield CD block data sizes of 2048, 2052, 2056, 2332, 2236, 2340 or 2352 bytes. In addition, some embodiments of device controller 200 store the CD block data from different CD-ROM blocks contiguously in one data area and P-W subcode data of different CD-ROM blocks contiguously in another data area of the cache.

FIG. 3(*c*) shows details of data block 326 where storage device 201 is a DVD drive. For a DVD, data block 326 includes identification data 352 (4 bytes), identification error detection code 354 (2 bytes), copyright management information 356 (6 bytes), DVD data 358 (2048 bytes), and error detection code 359 (4 bytes).

Typically, DRAM memory buffer 211 is organized as a dual-port FIFO, i.e. data is read out of DRAM memory buffer 211 in the same order as the data was stored. Buffer manager 204 includes a host transfer block pointer 390 and a storage device interface 208 includes a storage media transfer block pointer 395. Host transfer block pointer 390 (FIG. 3(*a*)) is used to calculate the address of the appropriate block of data being sent to or received from host computer system 190. Storage media transfer block pointer 395 is used to calculate the address of the appropriate block of data being sent to or received from storage media 110. For a read transaction, host transfer block pointer 390 is the read pointer for DRAM memory buffer 211 and storage media transfer block pointer 395 is the write pointer for DRAM memory buffer 211. Conversely, for a write transfer, host transfer block pointer S9O is khe write pointer and storage media transfer block pointer 395 is the read pointer. Both host transfer block pointer 390 and storage media transfer block pointer 395 can be stored in registers or counters. In one embodiment host transfer block pointer 390 and storage media transfer block pointer 395 point to storage media blocks in DRAM memory buffer 211. In other embodiments, host transfer block pointer 390 and storage media transfer block pointer 395 are logical block addresses compatible with those that are sent from host computer system 190. In either case, DRAM controller 206 uses block pointers 390 and 395 to access DRAM memory buffer 211. In addition, DRAM controller 206 monitors host transfer block pointer 390 and storage media transfer block pointer 395 to insure that data is not written over data blocks that have not yet been transferred out of DRAM memory buffer 211.

Storage device interface 208 converts a logical block address (LBA) received from host computer 190, corresponding to a logical block, a unit of data as recognized by the host computer 190, to units appropriate for physical device 201. In a CD-ROM drive, the logical block address is converted to an "MSF" address. The MSF address is the physical address used for accessing a CD-ROM disk. An F field corresponds to one physical sector. An S field unit is 75 F field units and an M field unit is 60 S field units. Valid F fields vary from 0 to 74, S fields vary from 0 to 59, and M fields vary from 0 to 99. A CD-ROM physical sector size is 2048, 2052, 2056, 2332, 2336, 2340 or 2352 bytes per sector. See ATAPI CD-ROM specification, page 73. These values correspond to different user data plus various configurations of header, subheader and error codings. Id. CD-ROM disks are typically less than 72 minutes long and each data block corresponds to a 7.5 millisecond frame.

ATA or ATAPI commands are received from host computer system 190 by computer interface 203. Computer interface 203, buffer manager 204, and autohost 205 detect the presence of a command and sends an interrupt to microprocessor interface 209, alerting microprocessor 202 of the presence of the command. Microprocessor 202 processes the interrupt and also alerts storage device 201.

Figure 4:
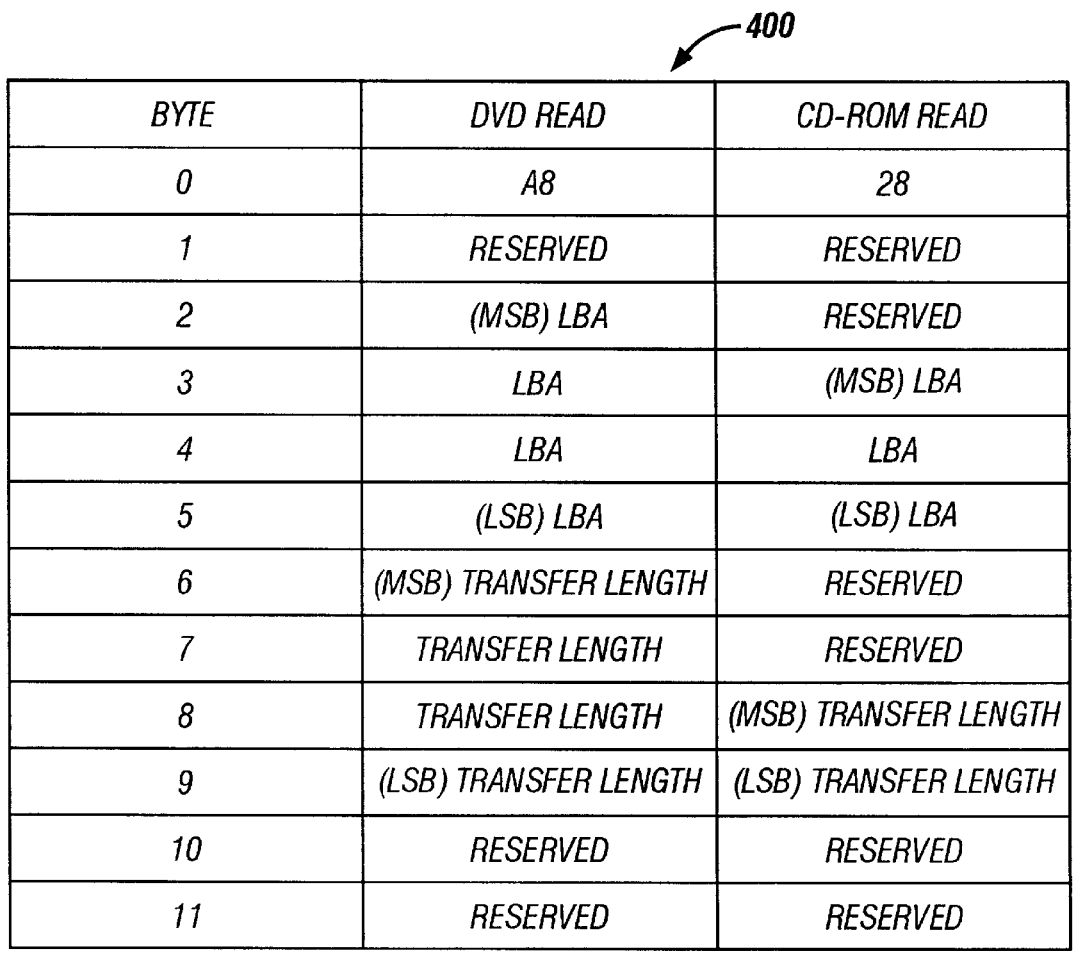
FIG. 4 shows a 12 byte command packet compatible with the ATA/ATAPI protocol.

The ATAPI command is a 12 byte command. FIG. 4 shows a 12 byte command packet 400 compatible with the ATA/ATAPI protocol. Byte 0 of the 12 byte command contains the operation code. An operation code of A8h (A8 in hexidecimal format) corresponds to a read command for a DVD storage device. An operation code of 28h corresponds to a read command for a CD-ROM device. Other operational codes are available to query the physical storage device system (Device Controller 200, storage device 201, microprocessor interface 209, and DRAM memory buffer 211) regarding status or to request mechanical commands (such as loading or unloading of CDs). See ATAPI Specification, page 90.

Bytes 1 of the 12 byte packet command is reserved and is always set to 0. For a DVD storage device, byte 2 is the most significant byte (MSB) of the logical block address (LBA). Bytes 3, 4, and 5 hold the logical block address, if required by the operation corresponding to the operation code in byte 0. If the command packet contains a read command, bytes 3–5 contain the logical block address at which data is to be read, with byte 5 containing the least significant byte (LSB) of the logical block address. If the command packet contains a write command, bytes 2–5 contain the logical block address at which data is to be written. In DVD devices, bytes 6–9 indicates the number of blocks of data to be transferred. In CD-ROM devices, bytes 6 and 7 are reserved and are always set to 0. Bytes 8–9 indicate the number of blocks to transfer. Bytes 10 and 11 are reserved and should both be 0.

Buffer manager 204 receives command packets from host computer system 190 and also receives and controls the flow of data packets to and from DRAM memory buffer 211. Several implementations of buffer manager 204 are described in U.S. patent Ser. No. 08/788,312, filed on Jan. 24, 1997, assigned to the assignee of this invention, incorporated herein by reference in its entirety, now U.S. Pat. No. 5,946,708 issued on Aug. 31, 1999. These buffer managers are Capable of transferring data between DRAM memory buffer 211 and host computer system 190 with minimal involvement from microprocessor 202.

Buffer manager 204 is connected to and partially controlled by a autohost 205. Autohost 205, on specific read conditions, directs buffer manager 204 to transfer data blocks already resident in DRAM memory buffer 211 to host computer 190.

In a read command autohost 205 intervention, a command packet is received by computer interface 203 and stored in buffer manager 204. Buffer manager 204 and autohost 205 detect the presence of the command packet and notifies microprocessor 202. Microprocessor 202 interprets the command and notifies storage device interface 208 and physical storage device 201, thereby initiating the read operation. The starting address which is present as a logical block address in the command packet is converted by storage device interface 208 into device dependent addressing (MSF format in CD-ROM physical sector number (PSN) format in DVD). Storage device 208 transfers data to storage device interface 208 in data block format. Storage device interface 208 transfers the data for storage in DRAM memory buffer 211 to DRAM controller 206. After transfer of each block, valid cache count 207 is incremented. Storage device interface may retain and store a set number of data packets, for example five, before sending all of the packets as a group to DRAM controller 206 for storage in DRAM memory buffer 211. At an appropriate time, usually after a set number of data blocks are stored in DRAM memory buffer 211 for transfer to host computer system 190, microprocessor 202 alerts buffer manager 204. Buffer manager 204 then starts to transfer the data blocks stored in DRAM memory buffer 211 to host computer system 190. After each data block is removed from DRAM memory buffer 211 by buffer manager 204, buffer manager 204 decrements valid cache count 207. A write to storage device 201 is accomplished by reversing the above steps.

The physical storage device does not stop reading data and sending it to storage device interface 208 when the end of the requested read is reached, however. According to this invention, device controller 200 continues to buffer data past the end of the read request up to and including the point where DRAM memory buffer 211 is filled and all data from the previous read request has been transferred to host computer system 190. Under these conditions, a subsequent read request to a logical block address corresponding to the first data block in DRAM memory buffer 211 and having a transfer length (i.e., the number of data blocks to be read from that address) less than the valid cache count VCBEL in valid cache count register 207 (i.e., the number of data blocks currently stored in DRAM memory buffer 211) is intercepted by autohost 205 and the data is transferred without involving microprocessor 202. In one embodiment, the autohost condition is met only if the first data block contained in DRAM 211 corresponds to the starting logical block address of the read request. In other embodiments, the autohost condition is met if all of the data blocks requested by the read request are contained in DRAM memory buffer 211. Autohost 205 only intervenes in a read request that matches the autohost conditions. Commands that do not trigger an autohost condition are ignored by autohost 205.

Figure 5:
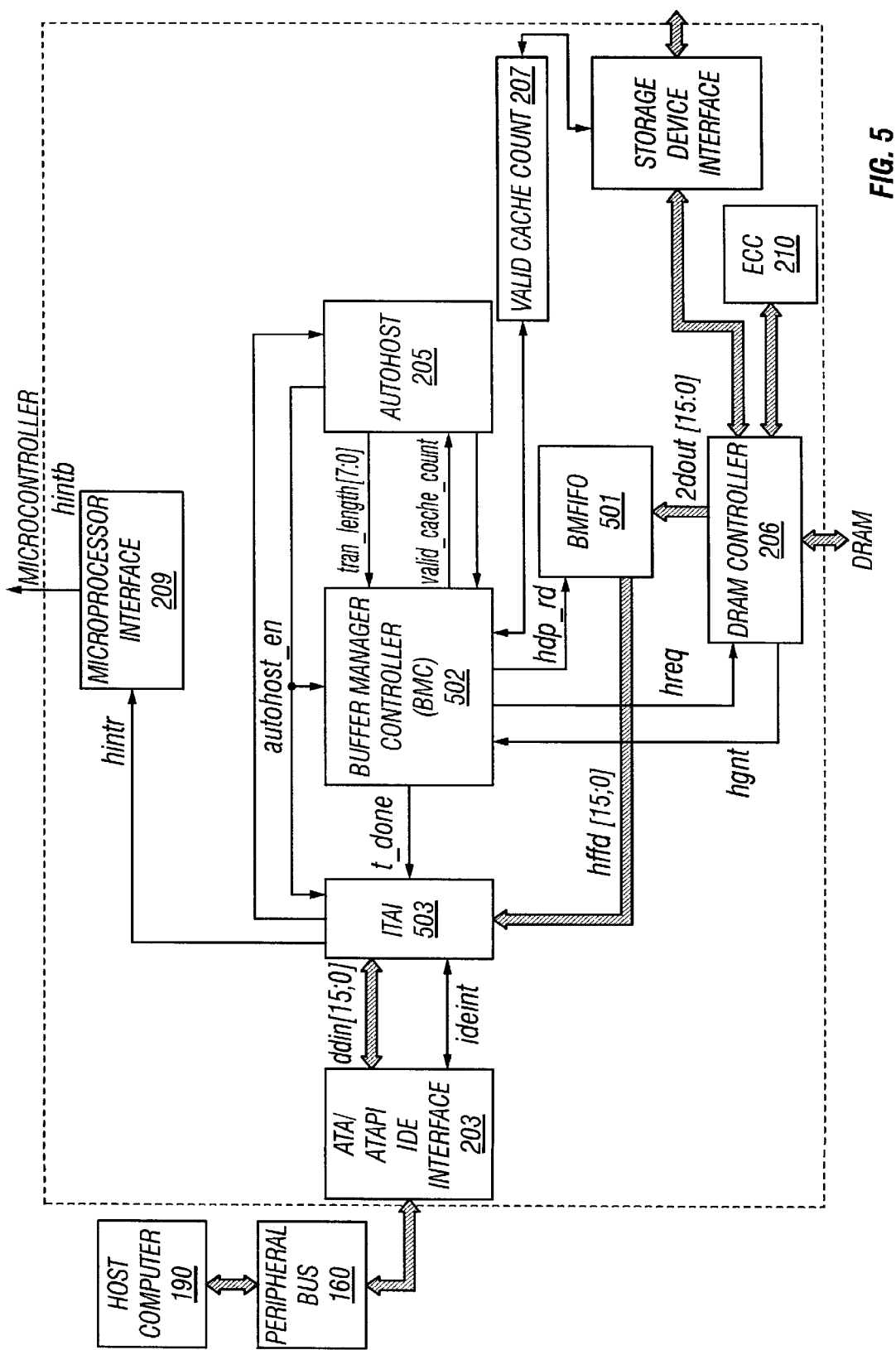
FIG. 5 shows a functional block diagram device controller according to an embodiment of the present invention.

FIG. 5 shows an expanded functional diagram of device controller 200. In FIG. 5, buffer manager 204 is expanded to an ITAI 503, buffer manager controller (BMC) 502 and a first-in-first-out buffer (BMFIFO) 501. BMC 502 communicates with autohost 205, ITAI 503, DRAM controller 206, and BMFIFO 501. ITAI 503 generates the appropriate interface signals and protocols for communication with interfaces 203 and 209. ITAI 503 also generates hintr and ideint interrupt signals. The hintr interrupt signal indicates that the internal interrupt indication originates with BMC 502 and is generated when a T_done signal indicates that the total data block transfer is completed. The ideint interrupt is generated in response to interface 203, such as when a new command is received or a reset is detected.

In many embodiments, BMFIFO 501 receives and stores data from DRAM controller 206 and transmits the data to peripheral bus 160 through ITAI 503. BMFIFO 501 operates under the control of BMC 502. In many embodiments, BMFIFO 501 is a dual-port FIFO memory structure using double buffering. Therefore, BMFIF0 501 contains two dual-port FIFO buffers. Both dual-port FIFO buffers are coupled to DRAM controller 206 and to ITAI 503 and are used in well known double-buffering schemes so that while one of the dual-port FIFOG is being filled, the other is being emptied until the transfer of data is complete.

The autohost feature of device controller 200 operates to control BMC 502 if the autohost condition is met. Upon receipt of a 12 byte command packet by computer interface 203, autohost 205 checks for an autohost condition. In the preferred embodiment, the autohost conditions include the following conditions: that the operational command in byte 0 is either A8h or 28h (indicating a read request); that the logical block address (LBA) sent in bytes 3–5 of the command packet is the logical block address (LBA) of the first data packet stored in DRAM; that byte 8 of the command packet is between 0 and the valid cache count (VCBEL) if the operational command is 28h and 0 if the operation command is A8h; and that byte 9 of the command packet is between 0 and VCBEL if the operational command is A8h and 0 if the operational command is 28h. In some embodiments, the autohost condition exists when only a portion of the data requested is stored in memory buffer 211. Optionally, device controller 200 will generate error messages if the reserved bytes of the read command packet—bytes 1, 2, 6, 7, 10 and 11—are not 0. If the autohost conditions are met, autohost generates an autohost_en signal.

If the autohost_en signal is not generated, indicating that the autohost conditions are not met, then an interrupt, hintr, is sent to microprocessor 202 and microprocessor 202 processes command under the direction of the firmware. If the autohost_en signal is generated, then the autohost_en signal is sent to ITAI 503 and to DMC 502, the bran_length [7:0] word, indicating the length of transmission and read directly from either byte 8 or byte 9 of the command packet, is also sent to BMC 502. Finally, interrupt hintr is sent to microprocessor 202 so that the next set of contiguous blocks of data can be read and stored in DRAM memory buffer 211.

Upon receipt of the autohoat_en signal, BMC 502 loads the following registers contained within device controller

200: total transfer block count (ttbl) is loaded with tran_length[7:0]; host transfer block pointer 390 (htba) is loaded with auto host buffer pointer (ahtba) where ahtba corresponds to the read logical block address; transfer offset 1 (hboa1), the number of bytes from the beginning of the data block to the first data byte, 24 or 12 depending on the format anticipated by the firmware; transfer length 1 (tol1) is loaded with the number of bytes in a data block, i.e., 2048 bytes; transfer offset 2 (hboa2) is loaded with 0; transfer direction (wrdir) is loaded with 0, indicating that data is transferred to host computer 190; auto cache enable (acache_en) is set to 1, auto complete enable (acpl_en) is set to 1, and start transfer enable (tsfd_flag) is set to 1. After the start transfer enable (tsfd_flag) signal has been set, the transfer state machine in buffer manager controller 502 starts. If autohost 205 does not detect an autohost condition, then the above registers are loaded under the direction of microcontroller 202.

Figure 6:
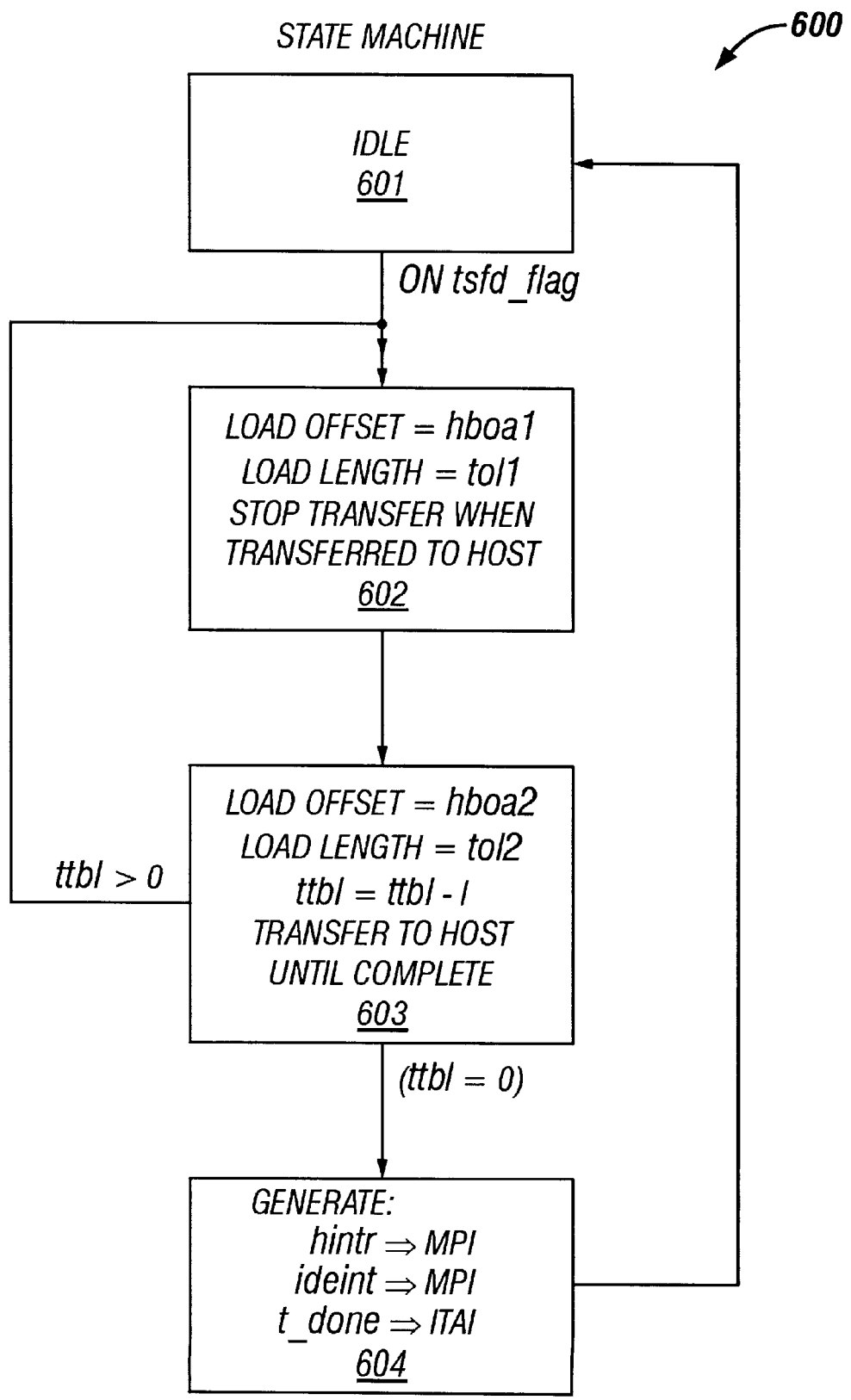
FIG. 6 shows a state machine used by the memory buffer controller to transfer data from the memory buffer to the host computer.

The BMC state machine is shown in FIG. 6. Initially, the state machine is in an idle state 601. The state machine returns to idle state 601 once the transfer of data to host computer 190 is complete. When the tsfd_flag signal is set, the state machine loads the offset value with hboa1. The length value is set to value tol1. After which, transfer to the host computer is started until the total number of bytes in the data block pointed to by htba is transferred to host computer 190. In the example embodiment above, the data block contains 2048 bytes of data. The transfer in state 602 continues until all of the data in the data block is transferred.

After the data in the data block is transferred, state machine 600 enters state 603 where offset is loaded with hboa2 and length is loaded with tol2. The state machine then starts transfering the second segment of data, which is specified by hboa2 and tol2, after the number of bytes determined by tol2 is read by the host. When autohost is enabled, hboa2 and tol2 are both set to 0. The parameter ttbl is then decremented by one and the value htba is incremented by 1. Provided itbl is still greater than 0, the state machine returns to state 602. When the total number of blocks has been transferred to host computer 190, the state machine enters state 604 where interrupts hintr and ideint are generated and sent to microprocessor interface 209. In addition, the flag t_done is generated and sent to ITAI 503 indicating the completion of the data transfer.

When the flag t_done indicates the completion of transfer, ITAI 503 generates a "command completion sequence" for transfer to interface 203, as well as the hintr interrupt for interface 209. An example of a command completion sequence includes setting the BSY bit of the ATAPI status register, clearing the ATAPI error register, setting the IO and CoD bits of the ATAPI reason register, setting the DRDY bit and clearing the DRQ and CHECK bits of the ATAPI status register, clearing the BSY bit of the ATAPI status register and generating an interupt request to host computer 190. Once the command completion sequence is complete, the state machine then returns to idle state 601.

State machine 600 shown in FIG. 6 also operates to load DRAM memory buffer 211 from host computer 190 in a write transfer. In addition, a read transfer where the autohost condition is not met is handled by the same state machine. When the autohost condition is not met, the parameters of device controller 200 are set under the direction of microprocessor 202 instead of buffer manager controller 202 and autohost 205.

FIGS. 7(*a*-1), 7(*a*-2), 7(*b*-1), 7(*b*-2), 7(*c*-1), 7(*c*-2), and 7(*d*) show Verilog code for an implementation of the autohost as described above. The above examples are demonstrative only. Certain variations on these examples will be obvious to one skilled in the art and are included within the scope of this invention. As such, the scope of this invention is limited only by the following claims.

We claim:

1. A method of transferring data between a storage device and a peripheral bus of a host computer, comprising:
   after a read operation, filling a memory buffer with data blocks from a storage device contiguously starting from a first address, the first address being a last address of the read operation plus one; and
   on a subsequent read operation,
   generating an enable autohost signal if a beginning read address of the subsequent read operation and the first address are the same and if a transfer length is less than a valid cache count, the valid cache count indicating the number of data blocks stored in the memory buffer and the transfer length indicating the number of data blocks to be transferred on the subsequent read operation;
   if the enable autohost signal is enabled, the autohost manager transferring the transfer length number of data blocks starting from the beginning read address from the memory buffer to the peripheral bus.

2. The method of claim 1, and further including
   on the subsequent read operation, refilling the memory buffer from the storage device.

3. A method of transferring data between a storage device and a peripheral bus of a host computer, comprising:
   after a read operation, filling a memory buffer with data blocks from a storage device contiguously starting from a first address, the first address being a last address of the read operation plus one; and
   on a subsequent read operation,
   generating an enable autohost signal if a beginning read address of the subsequent read operation and the first address are the same and if a transfer length is less than a valid cache count, the valid cache count indicating the number of data blocks stored in the memory buffer and the transfer length indicating the number of data blocks to be transferred on the subsequent read operation;
   generating the enable autohost signal if the beginning read address is at least the first address but less than the first address plus the valid cache count and the transfer length is less than the first address plus the valid cache count minus the beginning read address;
   if the enable autohost signal is enabled, the autohost manager transferring the transfer length number of data blocks starting from the beginning read address from the memory buffer to the peripheral bus.

4. The method of claim 1, further including generating a command completion sequence and transferring the command completion sequence to the peripheral bus when the transfer length number of data blocks have been transferred to the peripheral bus.

5. A device controller, comprising:
   a memory buffer controller capable of reading and writing to a memory buffer;
   a storage device interface capable of receiving data from and sending data to an external storage device in response to signals, the storage device interface receiving data from and sending data to the memory buffer controller;
   a microprocessor controller communicating with a microprocessor, the microprocessor controlling the storage device interface;
   a host interface communicating with a host computer through a peripheral interface;

a buffer manager that transfers data between the storage device interface and the host interface in response to directions from the microprocessor; and an autohost that monitors command packets from the host computer and, if a autohost condition is met, controls the buffer manager in place of the microprocessor to transfer data between the memory buffer and the host interface, wherein after a read operation, the buffer manager fills the memory buffer with data from the external storage data starting from the last address requested in the read operation plus one.

6. The autohost of claim 5, further including a valid cache count indicating a number of data blocks contained in the data buffer and a first address indicating a logical address of a first data block contained in the data buffer.

7. The autohost of claim 6, wherein on a read operation the storage device interface receives data blocks contiguous to the read operation but having addresses beyond those requested by the read operation, those data blocks being stored in the memory buffer.

8. A device controller, comprising:

a memory buffer controller capable of reading and writing to a memory buffer;

a storage device interface capable of receiving data from and sending data to an external storage device in response to signals, the storage device interface receiving data from and sending data to the memory buffer controller;

a microprocessor controller communicating with a microprocessor, the microprocessor controlling the storage device interface;

a host interface communicating with a host computer through a peripheral interface;

a buffer manager that transfers data between the storage device interface and the host interface in response to directions from the microprocessor; and an autohost that monitors command packets from the host computer and, if a autohost condition is met, controls the buffer manager in place of the microprocessor;

a valid cache count indicating a number of data blocks contained in the data buffer and a first address indicating a logical address of a first data block contained in the data buffer, wherein after a read operation, the buffer manager fills the memory buffer with data from the external storage data starting from the last address requested in the read operation plus one;

wherein on a read operation the storage device interface receives data blocks contiguous to the read operation but having addresses beyond those requested by the read operation, those data blocks being stored in the memory buffer; and wherein the autohost condition includes that, on a subsequent read operation, a starting address of the subsequent read operation corresponds to the first address and that a transfer length is less than the valid cache count.

9. A device controller, comprising:

a memory buffer controller capable of reading and writing to a memory buffer;

a storage device interface capable of receiving data from and sending data to an external storage device in response to signals, the storage device interface receiving data from and sending data to the memory buffer controller;

a microprocessor controller communicating with a microprocessor, the microprocessor controlling the storage device interface;

a host interface communicating with a host computer through a peripheral interface;

a buffer manager that transfers data between the storage device interface and the host interface in response to directions from the microprocessor; and an autohost that monitors command packets from the host computer and, if a autohost condition is met, controls the buffer manager in place of the microprocessor;

a valid cache count indicating a number of data blocks contained in the data buffer and a first address indicating a logical address of a first data block contained in the data buffer;

wherein after a read operation, the buffer manager fills the memory buffer with data from the external storage data starting from the last address requested in the read operation plus one;

wherein on a read operation the storage device interface receives data blocks contiguous to the read operation but having addresses beyond those requested by the read operation, those data blocks being stored in the memory buffer; and wherein the autohost condition includes that, on a subsequent read operation, a starting address of the subsequent read operation corresponds to a data block contained in the memory buffer and that a last address of the subsequent read operation also correspond to a data block contained in the memory buffer, the last address being the starting address plus a transfer length.

10. A device controller, comprising:

a memory buffer controller capable of reading and writing to a memory buffer;

a storage device interface capable of receiving data from and sending data to an external storage device in response to signals, the storage device interface receiving data from and sending data to the memory buffer controller;

a microprocessor controller communicating with a microprocessor, the microprocessor controlling the storage device interface;

a host interface communicating with a host computer through a peripheral interface;

a buffer manager that transfers data between the storage device interface and the host interface in response to directions from the microprocessor;

a valid cache count indicating a number of data blocks contained in the data buffer and a first address indicating a logical address of a first data block contained in the data buffer;

an autohost that monitors command packets from the host computer and, if a autohost condition is met, controls the buffer manager in place of the microprocessor to transfer data between the memory buffer and the host interface;

wherein after a read operation, the buffer manager fills the memory buffer with data from the external storage data starting from the last address requested in the read operation plus one;

wherein on the read operation the storage device interface receives data blocks contiguous to the read operation but having addresses beyond those requested by the read operation, those data blocks being stored in the memory buffer;

wherein the autohost alerts the microprocessor and the memory buffer is refilled with data blocks contiguous from a subsequent read operation.

* * * * *